United States Patent [19]

Uchida

[11] Patent Number: 5,657,727
[45] Date of Patent: Aug. 19, 1997

[54] V-TYPE ENGINE INDUCTION SYSTEM

[75] Inventor: Masahiro Uchida, Iwata, Japan

[73] Assignee: Yamaha Hatsudoki Kabushiki Kaisha, Iwata, Japan

[21] Appl. No.: 584,880

[22] Filed: Jan. 11, 1996

[30] Foreign Application Priority Data

Jan. 14, 1995 [JP] Japan .................................... 7-021281

[51] Int. Cl.$^6$ ................................................ F02M 35/10
[52] U.S. Cl. .................. 123/184.34; 123/184.47
[58] Field of Search ..................... 123/184.34, 184.47, 123/184.53

[56] References Cited

U.S. PATENT DOCUMENTS

| | | | |
|---|---|---|---|
| 2,382,244 | 8/1945 | Lundquist et al. | 123/184.34 |
| 2,845,911 | 8/1958 | Gill . | |
| 3,520,284 | 7/1970 | Ruoff et al. | 123/184.34 |
| 4,341,186 | 7/1982 | Mayr et al. | 123/184.53 |
| 4,641,610 | 2/1987 | Rutschmann | 123/184.36 |
| 4,989,553 | 2/1991 | Ueda | 123/184.31 |
| 5,063,885 | 11/1991 | Yoshioka | 123/184.34 |
| 5,092,285 | 3/1992 | Beaber | 123/184.34 |
| 5,127,370 | 7/1992 | Suzuki et al. | 123/432 |

FOREIGN PATENT DOCUMENTS

| | | |
|---|---|---|
| 0177794 | 4/1986 | European Pat. Off. . |
| 0215628 | 3/1987 | European Pat. Off. . |
| 0355960 | 2/1990 | European Pat. Off. . |
| 0402091 | 12/1990 | European Pat. Off. . |
| 0413213 | 2/1991 | European Pat. Off. . |
| 0450530 | 10/1991 | European Pat. Off. . |
| 2750586 | 7/1978 | Germany . |
| 830305 | 3/1960 | United Kingdom . |

OTHER PUBLICATIONS

Motortechnische Zeitschrift, vol. 52, No. 6, Jun. 1, 1991.

*Primary Examiner*—David A. Okonsky
*Attorney, Agent, or Firm*—Knobbe, Martens, Olson & Bear LLP

[57] ABSTRACT

A V-type engine induction system therefor that is adapted to provide a compact induction system and one which will provide equal air flow to all of the cylinders and eliminate rumbling noises.

15 Claims, 10 Drawing Sheets

V-TYPE ENGINE INDUCTION SYSTEM

BACKGROUND OF THE INVENTION

This invention relates to an induction system for internal combustion engines and more particularly to an improved, compact, high-efficiency induction system for a V-type engine.

As is well known, the induction system for an internal combustion engine is very instrumental in determining the performance of the engine. Generally, the induction system is designed so as to provide an intake manifold which delivers air from an atmospheric source to the intake passages of the cylinder heads. As is well known, the length of the intake passages that serve the individual cylinders is very instrumental in determining the performance of the engine. It has also been, the practice to provide compound induction systems wherein runners of different effective lengths can serve each combustion chamber.

It has also been found desirable to provide a plenum device for the induction system into which the individual manifold runners open. Air is introduced from the atmosphere into this plenum device and then from the plenum device to the individual runners for serving the cylinders. The use of the plenum device permits a common inlet to serve several cylinders without the pulsations from one cylinder from adversely effecting other cylinders.

It should be readily apparent from the foregoing description that the induction system can occupy a fairly substantial area. This is a particular problem with automotive engines and engines in various other applications where space constraints and engine height are particularly important factors.

It is, therefore, a principal object of this invention to provide an improved and compact induction system for an internal combustion engine.

The problems aforenoted are particularly acute in conjunction with V-type engines. V-type engines are preferred in many applications because the orientation of the cylinders permits a more compact engine. Also, by inclining the cylinder banks at an angle to each other, the overall height of the engine can be reduced, although the width is increased.

For a variety of reasons, it has been the practice with V-type engines to position the induction system in the area or valley formed between the cylinder banks. By using this otherwise void area, the construction can be made more compact.

One way in which the system can be made compact is by positioning the plenum chamber at the lower portion of the valley. The manifold runners then can extend upwardly from the plenum chamber and across the upper portion of the valley to the cylinder head intake passages. This provides a relatively compact assembly.

With type of arrangement, however, it has been the practice to provide the atmospheric air inlet to the plenum chamber at one end of the plenum chamber. Frequently, the throttle valve for the engine or throttles valves are positioned at or in this atmospheric air inlet.

It has been found, however, that this type of arrangement has some disadvantages. First, because the atmospheric air is delivered to the plenum chamber at one of its ends, there may be an uneven distribution of air to the individual cylinders of the engine. This, obviously, adversely affects engine performance. Another problem which has been found to be attendant with this type of induction system is that the induction system generates what may be characterized as a rumbling noise.

It is, therefore, a further object of this invention to provide an induction system of this type wherein the induction system can be compact and also wherein equal air distribution to the cylinders is provided and the rumbling noise substantially eliminated.

SUMMARY OF THE INVENTION

This invention is adapted to be embodied in an internal combustion engine that is comprised of a pair of angularly related cylinder banks, each having at least two cylinder bores formed therein. A plenum chamber extends through a valley formed between the cylinder banks. A plurality of inlet manifold runners, each extend from an inlet within the plenum chamber upwardly in the valley from the plenum chamber and terminate at re-entrant delivery portions that extend generally downwardly to a connection for serving an inlet port formed in one of the cylinder banks. Means provide an atmospheric air inlet to, the plenum chamber at a point contiguous to the longitudinal center thereof.

DETAILED DESCRIPTION OF THE PREFERRED EMBODIMENTS OF THE INVENTION

Figure 1:
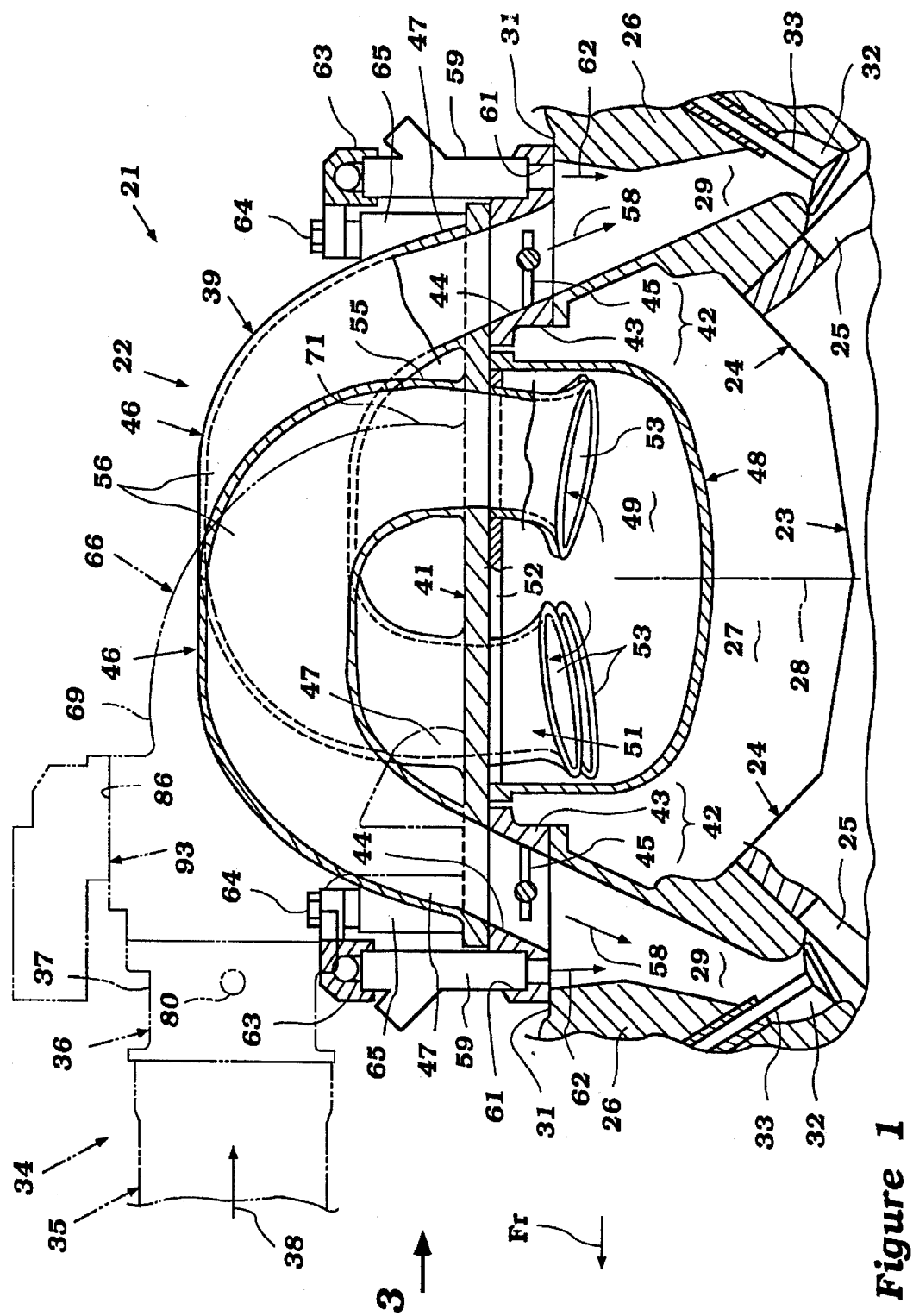
FIG. 1 is a cross-sectional view through a portion of a V-type engine having an induction system constructed in accordance with a first embodiment of the invention and is taken generally along the line 1—1 of FIG. 2.

Referring now in detail to the drawings and first to the embodiment of FIGS. 1–6 and initially to FIG. 1, an internal combustion engine constructed in accordance with a first embodiment of the invention is identified generally by the reference numeral 21. The engine 21 is shown only partially because the invention deals primarily with the induction system for the engine, which induction system for this and the remaining embodiments is shown in the remaining figures. The invention is particularly adapted for use with an induction system utilized with V-type engines, and only a portion of the engine is shown in order to see how the induction system, which is indicated generally by the reference numeral 22, interrelates with the remaining portions of the engine body.

This engine body is comprised of a cylinder block 23 having a pair of angularly inclined cylinder banks 24. Each of these cylinder banks 24 is provided with at least a pair of cylinder bores 25. As will be apparent from the remaining figures, the engine 21, as illustrated, is of a V-8 configuration, and hence there are four cylinder bores 25 for each of the cylinder banks 24. It will be readily apparent, however, from the following description how the invention may be employed in conjunction with V-type engines having other numbers of cylinder bores.

Cylinder heads 26 are affixed to each of the cylinder banks 24 in closing relationship with the cylinder bores 25. The area between the cylinder banks 24 and the attached cylinder heads 26 defines a valley 27 in which a portion of the induction system 22 is positioned, as will become apparent. The center plane of the engine 21 is indicated by the dot-dash line 28. This plane will be referred to as a longitudinal center plane because it passes longitudinally through the center of the engine with relation to the axis of the engine crankshaft and, in fact, contains this axis. However, the invention is particularly adapted for use with engines which are positioned in a transverse disposition in the engine compartment of an associated motor vehicle, with the front of the vehicle being indicated by the arrows Fr in the various views. Of course, it will be apparent to those skilled in the art how the invention may be utilized with other engine applications and orientations.

Since the invention, as aforenoted, deals primarily with the induction system 22 for the engine 21, the internal details of the engine 21 are not illustrated and will not be described further. However, it should be noted that each of the cylinder heads 26 has associated with each of the cylinder bores 25 intake passages, indicated generally by the reference numeral 29, which extend from inlet openings formed in generally horizontally extending planar surfaces 31 of the cylinder heads 26 on the side adjacent the valley 27.

These inlet passages 29 serve one or more intake ports 32 associated with each cylinder bore 25. Intake valves 33 are supported for reciprocation in the cylinder head 26 and are operated in any known manner so as to valve the opening and closing of the valve ports 32. In a preferred application for the invention, there are three intake ports 32 for each cylinder bore 25 served by a Siamesed intake passage 29. However, and as will be readily apparent to those skilled in the art, the invention may be utilized with a wide variety of types of intake and porting arrangement for engines, and particularly those having a V configuration.

Atmospheric air is supplied to the induction system 21 from an air inlet device, shown partially and in phantom in most of the figures where it appears. This air intake device is indicated generally by the reference numeral 34. This air inlet device includes an atmospheric air inlet and may include an air filter. The air inlet device 34 has an outlet 35 that is connected to a throttle body assembly, indicated generally by the reference numeral 36, and having an outer housing 37. This throttle body assembly 36 will be described in more detail later.

Atmospheric air enters the engine 21 in the direction of the arrow 38, which is a direction longitudinally of the vehicle and transversely to the longitudinal center plane 28.

As will also become apparent from the following description, this intake air flow is disposed substantially at the center of the induction system 22.

Referring now additionally to FIGS. 2–5, the induction system 22 includes an intake manifold, indicated generally by the reference numeral 39, which is disposed in substantial part in the valley 27 between the cylinder banks 24. The intake manifold 39 is comprised of a plate 41 that has outstanding portions that are affixed to the cylinder banks 28 with control valve bodies, indicated generally by the reference numeral 42, interposed between the plate 41 and the cylinder head surfaces 31.

The control valve assemblies 42 include control valve bodies 43 having flow passages 44 which are complementary to and aligned with the openings of the intake passages 29 of the cylinder heads 26 at the surfaces 31. Control valves 45 are supported in these passages 44 and are movable between a closed flow-restricting and flow-redirecting position, as shown in FIG. 1, in which the charge flowing through the intake passages 29 is channeled in such a way so as to increase its velocity and redirect the flow so as to generate a tumble action in the combustion chambers. The control valves 45 may be operated with any desired strategy, and when they are in their open positions, generally at mid-range and high-speed/high-load conditions, the flow passages 44 are substantially unrestricted.

A plurality of manifold runners, one for each cylinder head intake passage 29, are indicated by the reference numeral 46 and serve the individual intake passages 29 through registry with the control valve passages 44. Discharge ends 47 of the manifold runners are formed with openings that are complementary to the control valve passages 44 and supply the air to the cylinder head intake passages 29.

A plenum chamber forming shell, indicated generally by the reference numeral 48, is affixed to the underside of the manifold plate 41 in a suitable manner so as to provide a plenum chamber 49 which extends substantially the entire length of the valley 27, and thus provides the desired plenum chamber volume. Atmospheric air is delivered to this plenum chamber volume substantially at its center in a manner which will be described later.

It will be seen that this plenum chamber volume 49 is positioned substantially entirely within the valley 27 between the cylinder banks 24, and thus provides utilization of this otherwise dead space. This also permits the provision of a large plenum chamber volume 49 without raising the height of the engine 21. This is particularly important in conjunction with transverse engine placement in motor vehicles, but also is the case with many other engine applications, as will be readily apparent to those skilled in the art.

Figure 3:
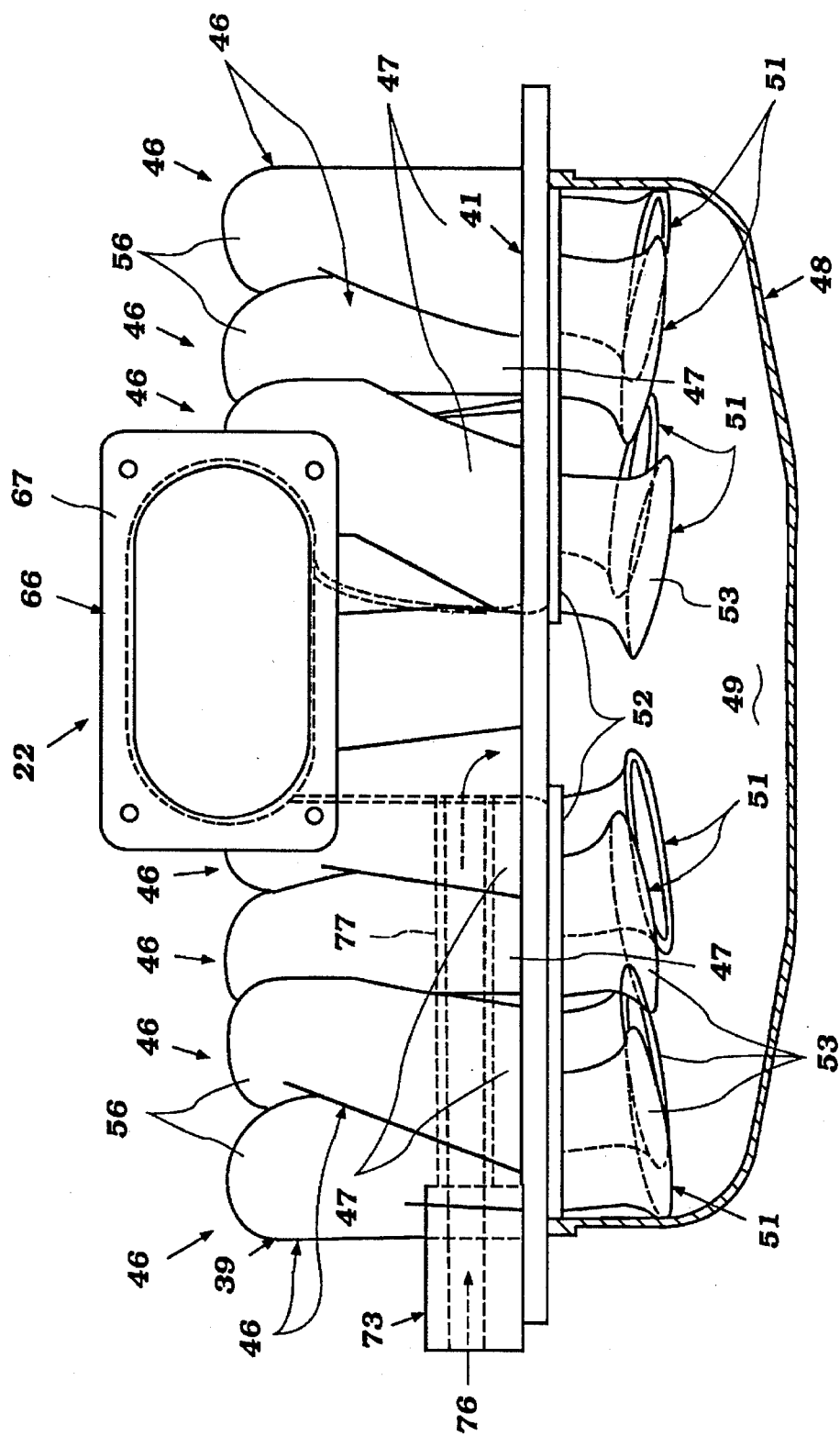
FIG. 3 is a side elevational view of the induction system taken in the direction of the arrow 3 in FIG. 1 and with portions of the induction system broken away and other portions removed.
Figure 4:
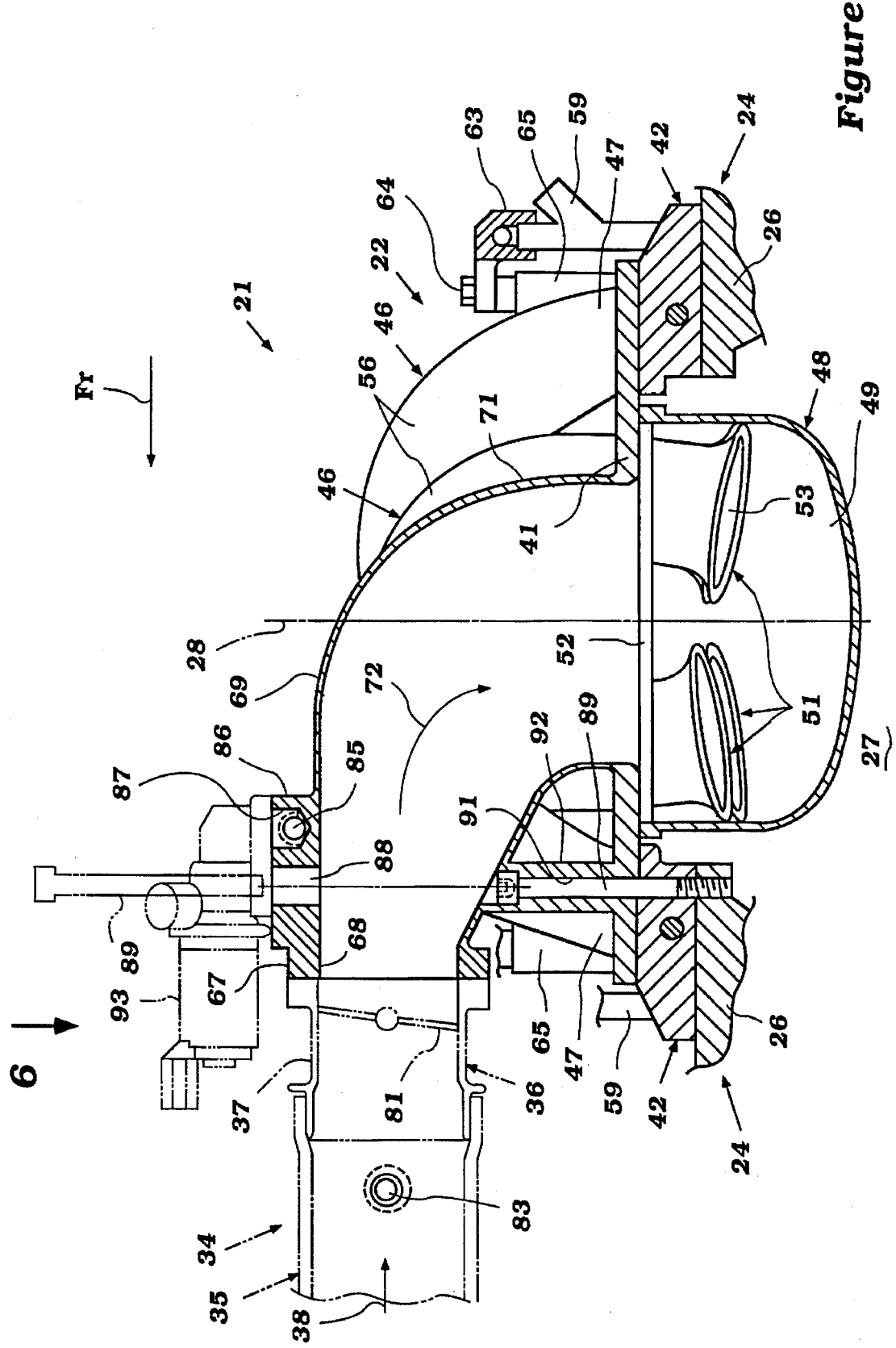
FIG. 4 is a cross-sectional view taken along the line 4—4 of FIG. 2.

A plurality of tuning necks or inlet trumpets 51 is affixed to a common mounting plate 52 that is affixed to the underside of the manifold plate 41. These inlet trumpets 51 have inlet openings 53 which are disposed within the plenum chamber volume 49. If desired and as illustrated in FIG. 3, there may be two plates 52, one at each end of the plenum chamber 49, each carrying four inlet trumpets 51. In this embodiment the inlet trumpets 51 all face generally downwardly toward the center of the plenum chamber volume 49. The trumpets 51 have preferably the same length.

It should be apparent, however, that this invention may also be utilized with an engine wherein a pair of intake manifold runners of different lengths serve each cylinder of the engine. In this case the paired inlet trumpets 51 for each cylinder may have different effective lengths, if that is desired.

Each intake manifold runner 46 has an inlet section 55 that is disposed across the valley 27 on the other side of the plane 28 from the cylinder head intake passage 29 which it serves. These inlet sections 55 cooperate with openings formed in the plate portion 41 and mate with the respective inlet openings 53 of the inlet trumpets 51 so as to form an extension of the intake path formed thereby. These inlet sections 55 extend generally upwardly and merge into horizontally extending portions 56 that extend transversely across the valley 27 toward the cylinder head 26 which they serve.

The portions 56 then turn downwardly and terminate in re-entrance portions which merge into the outlet sections 47 that communicate with the intake passages 44 of the control valve assemblies 42 previously referred to. As a result, it is possible to provide a relatively long length for the manifold runners 46 and the actual induction path serving each cylinder. This permits good induction tuning, and the length can be varied by changing the lengths of the trumpets 51 and/or the lengths of the runners 46. However, and as should be readily apparent from the foregoing description, these passages provide a very compact assembly, even though they may be quite long in their nature.

The flow through the runners 46 is indicated by the arrows 57 in certain of the figures, and it will be seen that the flow is from one side of the plane 28 in an upward and then transverse direction to the downwardly extending discharge ends 47 on the other side of the plane 28 serving the cylinder head intake passages 29 where the flow continues, as indicated by the arrows 58.

In the illustrated embodiment, the engine 29 is of the manifold injected type. To this end, fuel injectors 59 are mounted in socket portions 61 formed in the respective control valve bodies 43. These socket portions permit the fuel injectors to inject into channels formed at one side of the cylinder head intake passages 29 in the direction of the arrows 62. Thus, the injected fuel will mix well with the air flow in the cylinder head intake passages 29.

The fuel injectors 59 are supplied with fuel by respective fuel rails 63, which cooperate with the injectors 59 in a known manner. The fuel rails 63 are, in turn, affixed to the intake manifold 39 by threaded fasteners 64 which are threaded into tapped openings formed in bosses 65 formed on the manifold body.

The manner by which atmospheric air is introduced into the plenum chamber 49 will now be described. In addition to including the manifold runners 46, the intake manifold 22 includes an inlet section, indicated generally by the reference numeral 66, which is disposed between the center two runners 46 adjacent one of the cylinder banks 24, in this embodiment the forwardmost one relative to the direction of the engine compartment.

This inlet section 66 has a flange portion 67 to which the throttle body 37 is affixed by means of threaded fasteners or the like. This flange portion 66 has an inlet opening 68 which is complementary to the shape of the flow opening of the throttle body 36, as will be described later. The inlet section 66 has a generally horizontally extending part 69 which extends from the inlet opening 68 rearwardly and then turns downwardly at a section 71 which passes between the adjacent runners 46 and enters the plenum chamber 49 in a central location so that the air can flow there into in the direction indicated by the arrows 72.

Since the atmospheric air is delivered toward to the center of the plenum chamber 49, there will tend to be more equal flow through the manifold runners 46 so that each cylinder will develop the same horsepower. In addition, this central inlet location has been found to reduce the rumbling noise that might occur if the air were introduced to one end of the plenum chamber 49.

Figure 2:
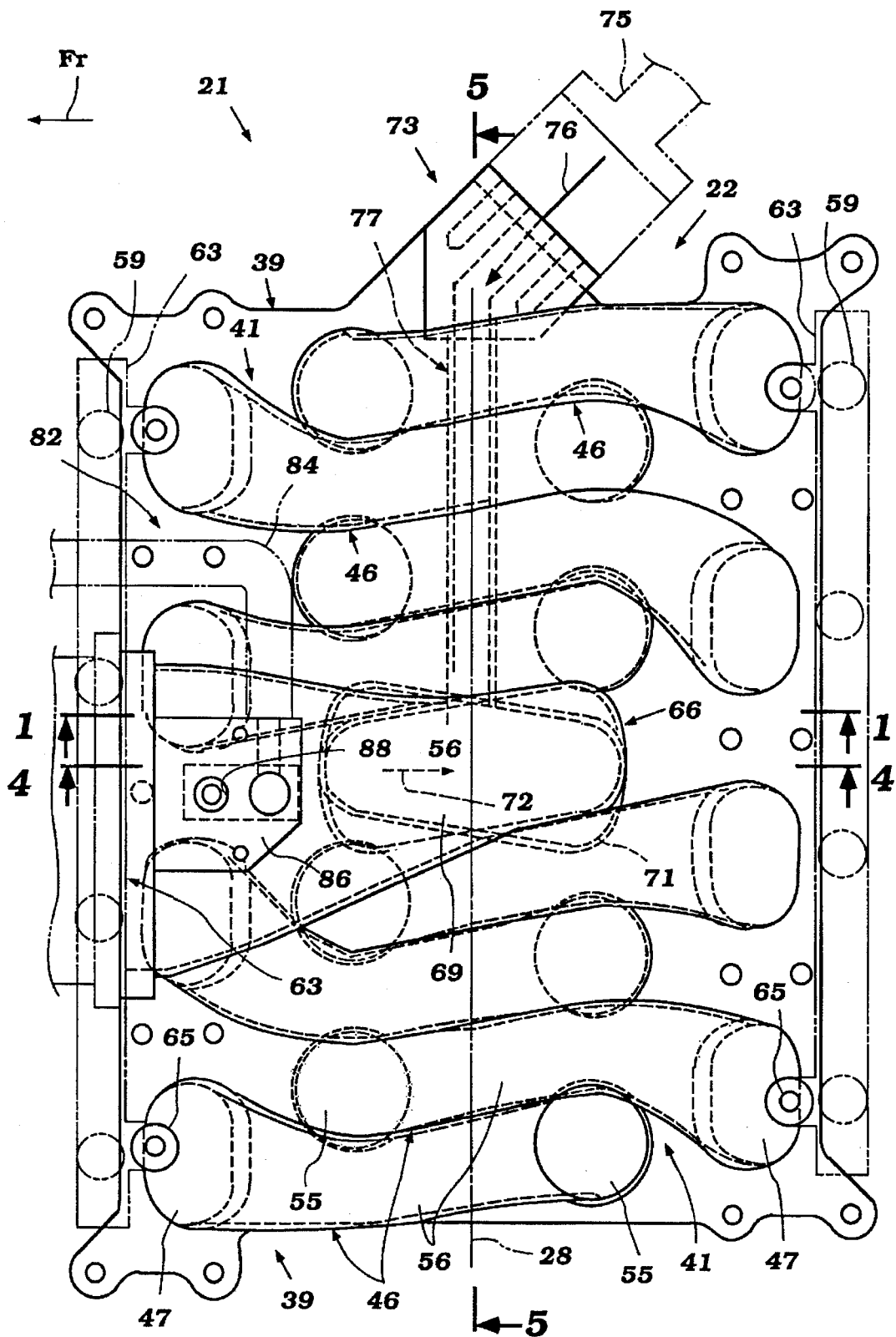
FIG. 2 is a top plan view of the induction system, deleting the remaining components of the engine and with portions of the induction system shown in phantom.

The induction system, and specifically the intake manifold 22, is also designed in such a way as to facilitate exhaust gas recirculation (EGR). To accomplish this, an EGR inlet fitting 73 is provided at one side of the upper surface of the plate portion 41 of the intake manifold 22. This EGR fitting 73 is adapted to receive an EGR valve 74 and conduit 75, which deliver exhaust gases from the exhaust system to the fitting 73 in the direction indicated by the arrow 76 (FIGS. 2 and 3).

Figure 5:
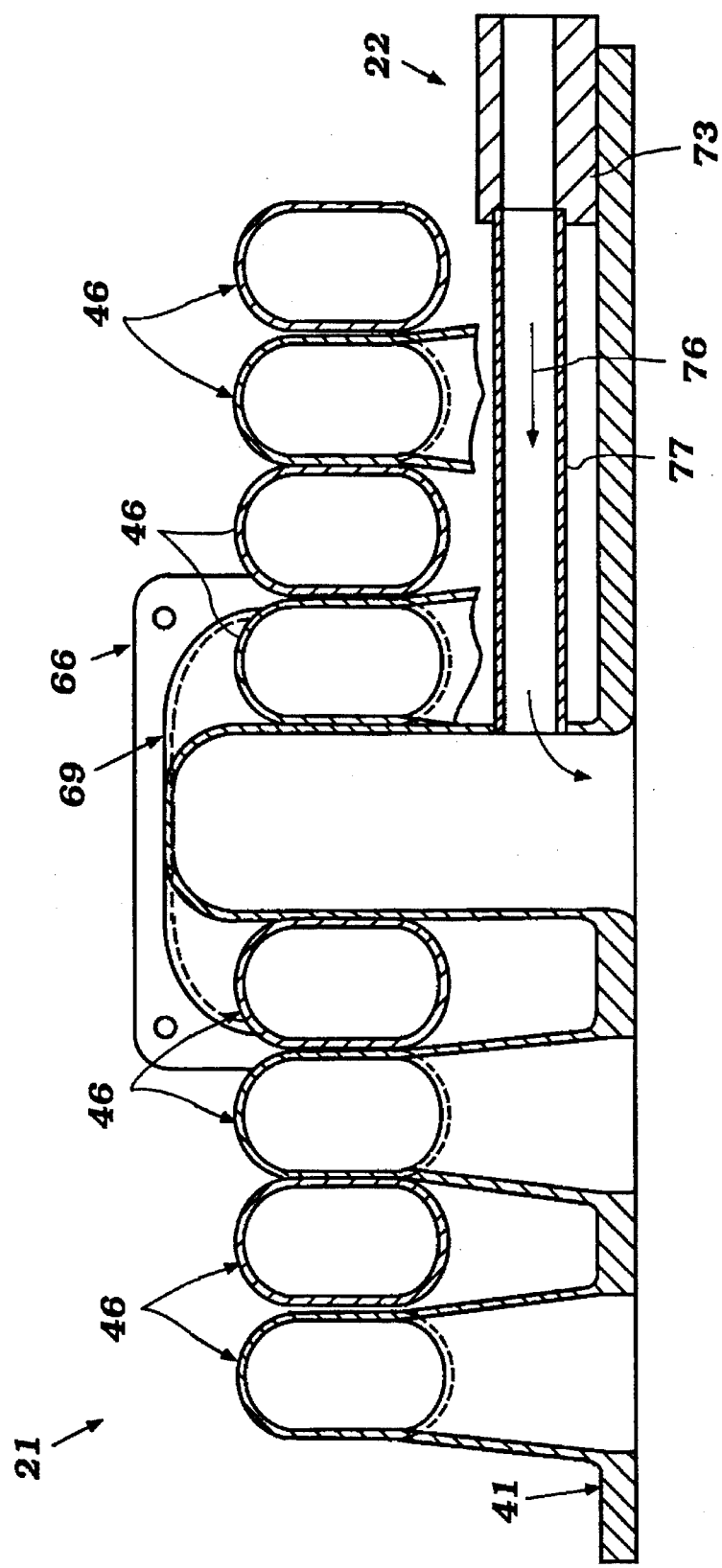
FIG. 5 is a cross-sectional view taken along the line 5—5 of FIG. 2.
Figure 6:
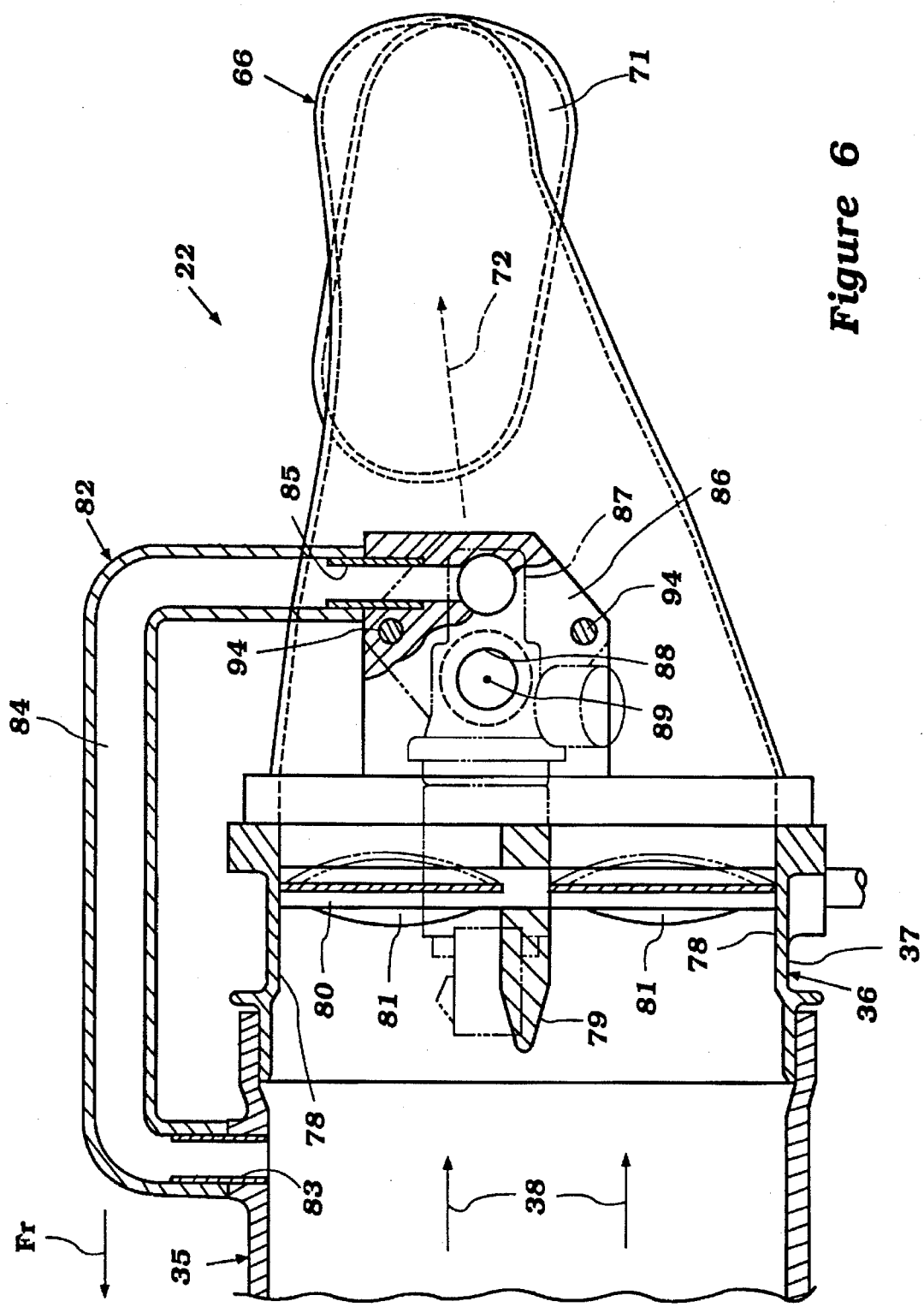
FIG. 6 is a top plan view, with a portion broken away and shown in section, of a first embodiment of idle air flow control and is taken looking generally in the direction of the arrow 6 in FIG. 4.

An EGR tube 77 is connected to the EGR inlet fitting 73 and extends in the area beneath the manifold runners 46, as best seen in FIG. 5, so as to deliver the exhaust gases that are recirculated into an area of the section 71 of the intake manifold inlet 66. Hence, the exhaust gases will be delivered and mixed with the intake charge before it enters the plenum chamber 49. This also assists in ensuring that there will be equal distribution of the EGR gases to all cylinders to maintain uniformity in their running.

The construction of a type of throttle body 36 that may be utilized with the manifold and one form of idle air control will now be described by primary reference to FIGS. 1, 2, 4, and 6. It will be seen that the throttle body 36 is provided with a pair of intake passages 78 that are separated by a dividing wall 79. The general configuration is an oval shape, but to permit the use of butterfly-type throttle valves, indicated by the reference numeral 81, the central portion of each of the passages 78 is circular. The throttle valves 81 are affixed to a common throttle valve shaft 80 that is operated in a known manner.

An idle air bypass system, indicated generally by the reference numeral 82, is provided for bypassing a certain controlled amount of air around the throttle valves 81 so as to permit adequate air flow for idle operation. In this way, the throttle valves 81 may, if desired, be maintained in a fully closed position at idle. To accommodate this bypass air flow, a fresh air inlet fitting 83 is provided in the air inlet device 35 upstream of the throttle body 36.

A bypass air conduit 84 is connected to this inlet fitting 83 and to an outlet fitting 85, which is formed in a boss 86 formed integrally in the manifold inlet section 66 adjacent its flange 68. An internal passageway 87 extends from this inlet fitting 85 to the upper surface of the boss 86.

The boss 86 is also formed with a through opening 88, which is sized sufficiently so as to pass a fastener 89, which may be one of a plurality of fasteners that secure the intake manifold 22 to the control valve bodies 42 and cylinder heads 26 when this passage aligns with a passage 91 in a boss 92 of the manifold plate portion 41. The fastener 89 may be positioned in place through the opening 88, as shown in phantom lines in FIG. 4.

In normal engine operation, however, an idle control valve assembly 93 is mounted on the boss 86 by means of fasteners 94, to close the passage 88 from the atmosphere. However, the control valve 93 has a valved internal passageway that communicates the passageway 87 with the passageway 88. By utilizing a device such as a stepper motor, the size of this passageway may be controlled and the idle air flow thus controlled, as well as the engine idle speed.

Figure 7:
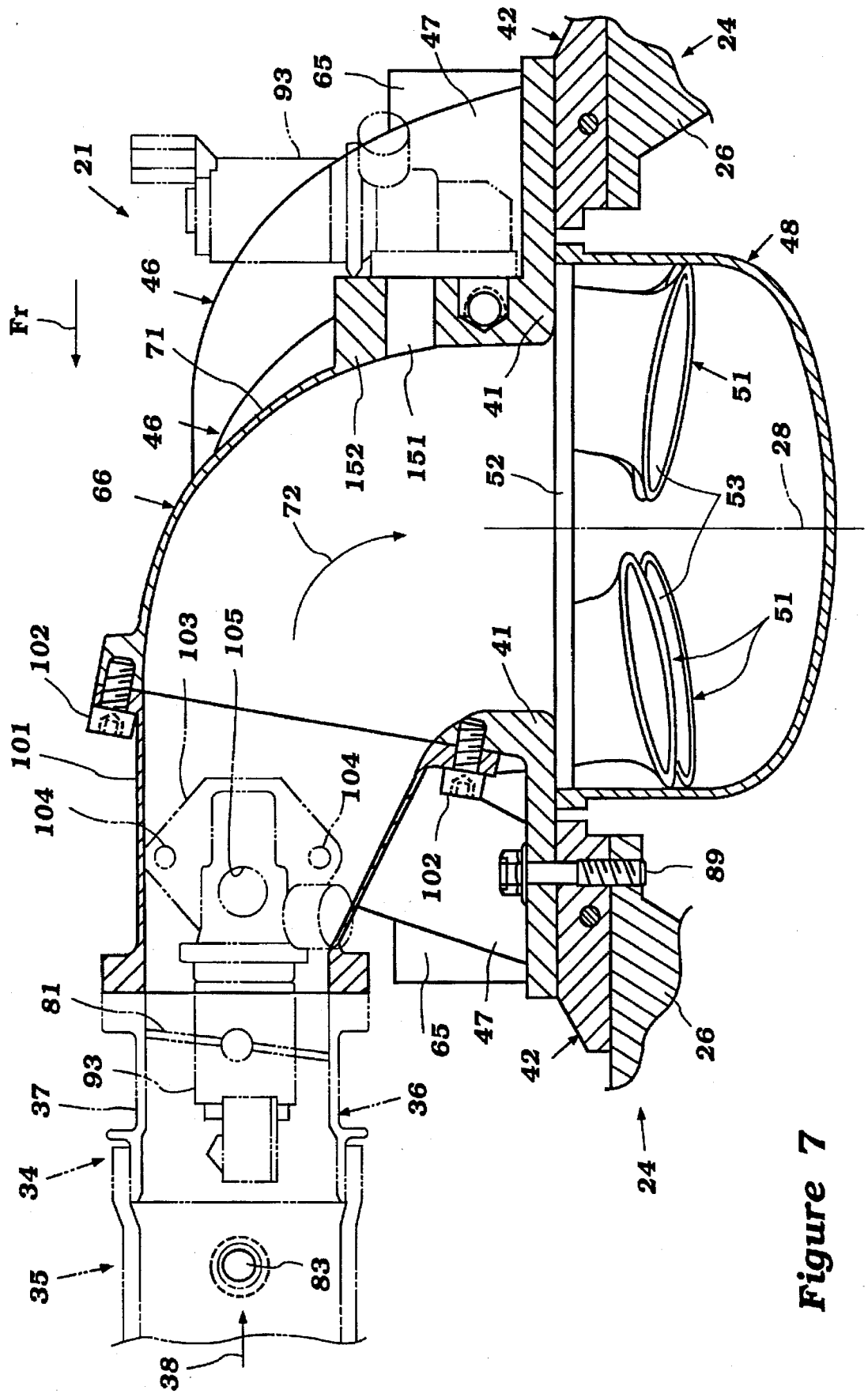
FIG. 7 is a cross-sectional view, in part similar to FIG. 4, and shows another embodiment of the invention with two alternative idle air flow control arrangements, each shown in phantom.
Figure 8:
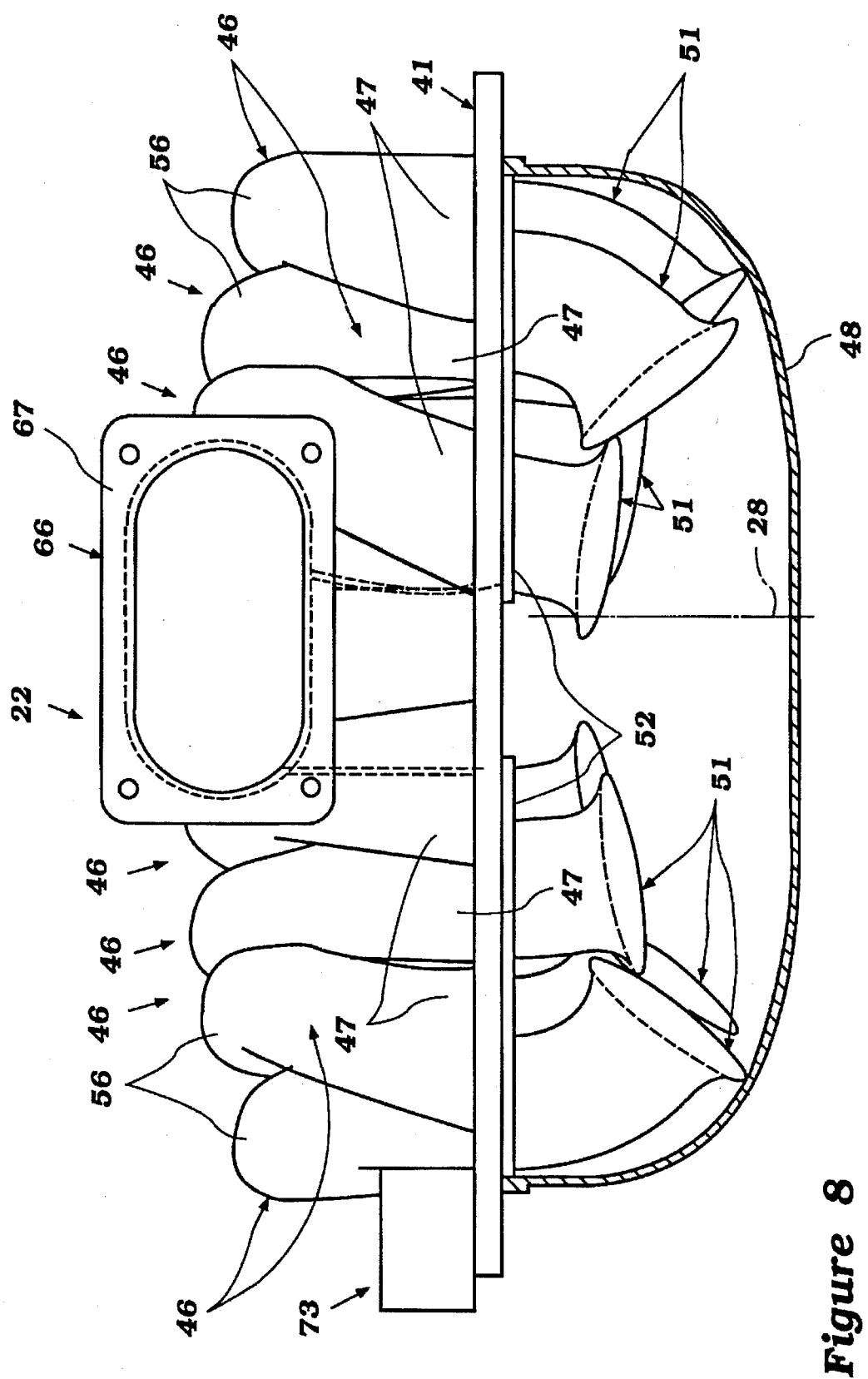
FIG. 8 is a view, in part similar to FIG. 3, and shows another embodiment of the invention.

FIGS. 7 and 8 show another embodiment of the invention, which permits a height reduction in the overall size of the engine by mounting the idle air control 93 from the upper portion of the intake manifold to a side of it. In this embodiment the manifold inlet section 66 is a two-part construction and includes an inlet section 101 that is affixed to the remainder of the manifold inlet section 66 by threaded fasteners 102. In all other regards, the configuration of the induction system is the same.

On the side of the manifold section 101, there is provided a mounting boss 103 on which the idle air control 93 is affixed by threaded fasteners 104. In this embodiment an idle air flow passage 105 is formed in the mounting boss 103, which need not be large enough to pass the threaded fastener 89 which is accessible in this embodiment by the removal of the manifold inlet section 101.

Shown at the right-hand side of this figure is an alternate location of the idle air system. In this embodiment the idle air is delivered through an idle air inlet opening 151 formed in a boss 152 on the side of the manifold inlet section 66 opposite to its inlet end. The idle air control valve 93 is mounted on this boss and controls the idle air flow in the manner previously described.

FIG. 8 shows another variation wherein the inlet trumpets 51 may be configured so that they extend in different directions with the innermost sections facing downwardly and the outermost sections facing inwardly. This will further assist in equal air flow to all of the cylinders of the engine.

Figure 9:
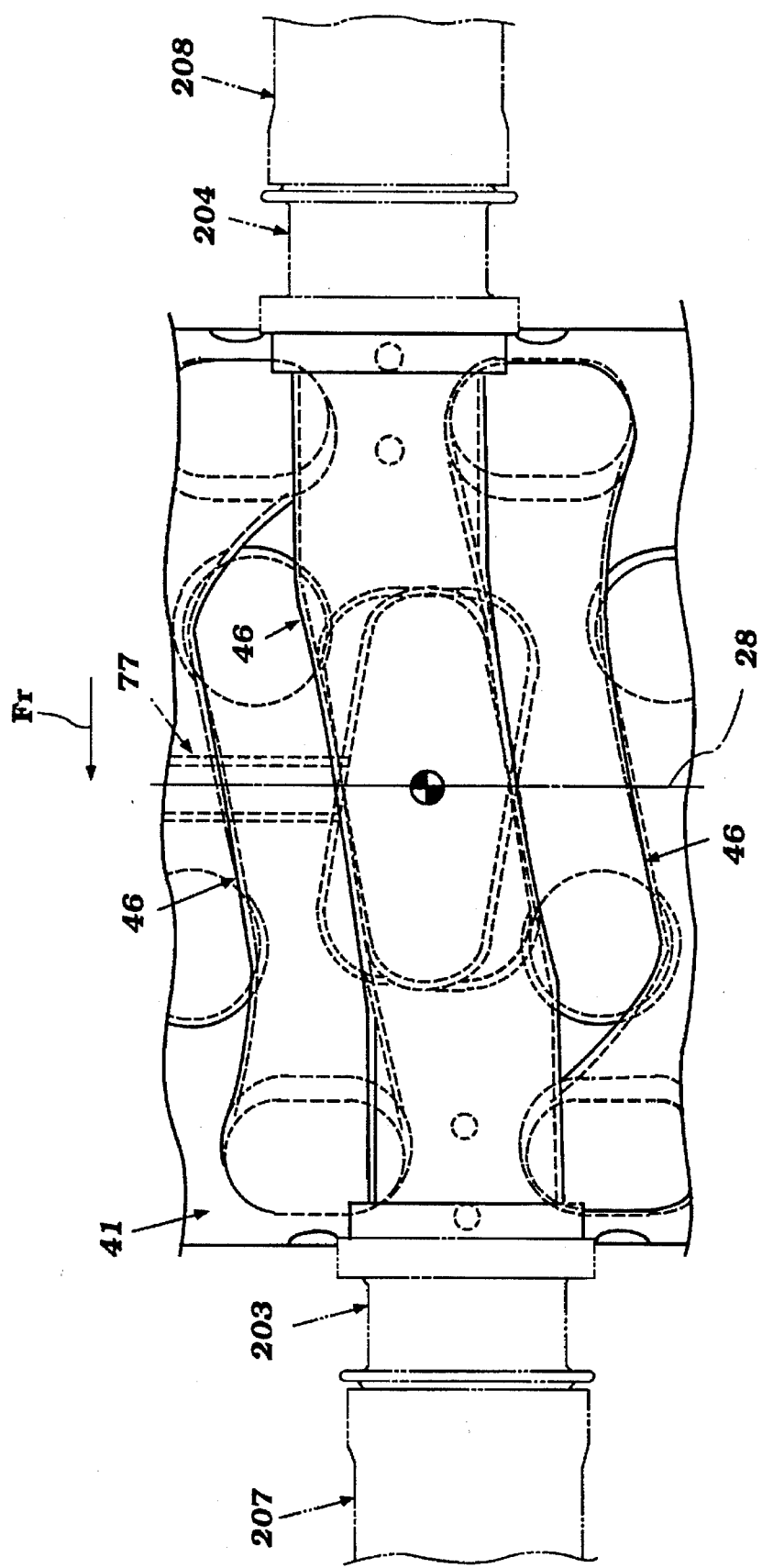
FIG. 9 is a partial top plan view, in part similar to FIG. 8, and shows another embodiment of the invention.
Figure 10:
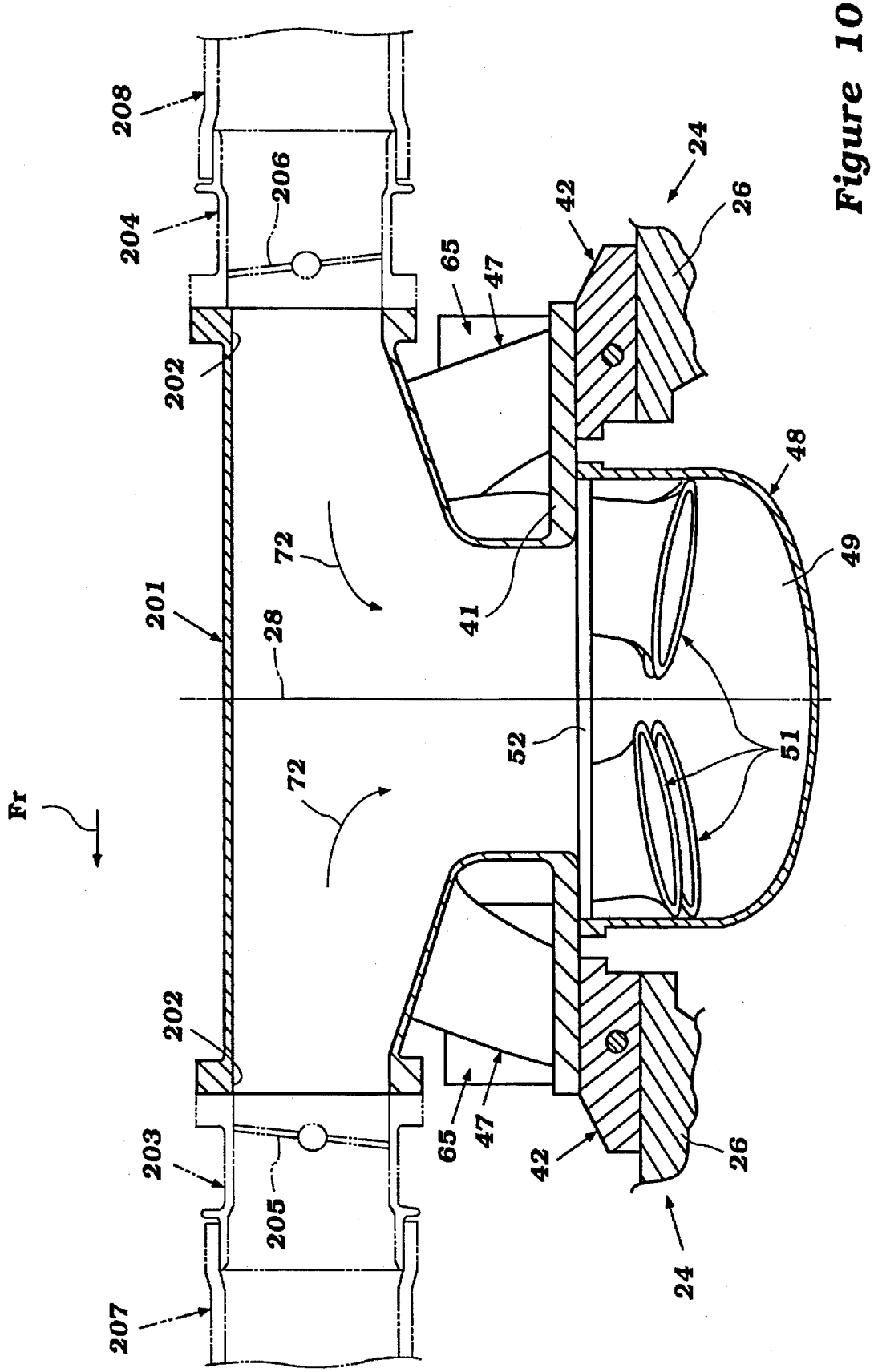
FIG. 10 is a transverse cross-sectional view taken through the embodiment of FIG. 9 along a plane passing through the center of the air intake arrangements for admitting air to the plenum chamber of this embodiment.

FIGS. 9 and 10 show another embodiment of the invention and a way in which the amount of air flow area can be increased over the previously described embodiments. Generally, the only difference between this embodiment and that of FIGS. 1–6 is in the inlet sections, and therefore only two figures are necessary to understand the construction of this embodiment.

In this embodiment an inlet section 201 having a generally T-shaped configuration has its upstanding leg in registry with the opening in the manifold mounting plate 41. A pair of branch openings 202 are formed at opposite sides of the horizontal leg of the inlet section 201, and left and right throttle body assemblies 203 and 204 are connected thereto. These throttle bodies contain respective throttle valves 205 and 206.

A common air inlet or a pair of air inlets has discharge portions 207 and 208 that cooperate with the throttle bodies 203 and 204, respectively,,so as to deliver air to the plenum chamber 49 centrally thereof. In this embodiment the throttle valves 205 may be operated either simultaneously with each other or may be operated in sequence, with only one being opened in the low range while the other is maintained fully closed, and both throttle valves opening at the high end of the engine performance.

It should be apparent from the foregoing description that the described embodiments provide not only compact induction systems, but also systems that provide good performance and reduced engine induction system noise. Of course, the foregoing description is that of preferred embodiments of the invention, and various changes and modifications may be made without departing from the spirit and scope of the invention, as defined by the appended claims.

What is claimed is:

1. An internal combustion engine comprised of a pair of angularly related cylinder banks each having at least two cylinder bores formed therein, a plenum chamber extending through a valley formed between said cylinder banks, a plurality of inlet manifold runners each extending from an inlet within said plenum chamber upwardly in said valley from said plenum chamber and terminating at a re-entrant delivery portion extending generally downwardly to a connection for serving an inlet port formed in one of said cylinder banks, an atmospheric air inlet in said plenum chamber at a point contiguous to the longitudinal center thereof and an atmospheric air supply extending from said atmospheric air inlet over one of the cylinder banks to an air inlet device disposed on one side of said valley.

2. An internal combustion engine as set forth in claim 1, wherein the engine is adapted to disposed in an engine compartment for a motor vehicle and extends transversely to the longitudinal center line of the motor vehicle.

3. An internal combustion engine as set forth in claim 1, further including a flow controlling throttle valve in the air inlet device.

4. An internal combustion engine as set forth in claim 3, further including an idle bypass passageway extending across the throttle valve for providing idle air flow to the engine.

5. An internal combustion engine as set forth in claim 3, further including means providing an exhaust gas recirculation inlet to the atmospheric air inlet device.

6. An internal combustion engine as set forth in claim 1, wherein there are a pair of atmospheric air supplies each extending over a respective one of the cylinder banks each served by a respective air inlet device at the respective side of the valley.

7. An internal combustion engine as set forth in claim 6, further including a manually operated throttle valve in each of the air inlet device for controlling the flow therethrough.

8. An internal combustion engine as set forth in claim 1, wherein the manifold runner inlets are formed in the plenum chamber on the side adjacent the cylinder bank spaced from that served by the runner and the re-entrant delivery portion is connected to the inlet by a connecting portion that extends transversely across the valley.

9. An internal combustion engine as set forth in claim 2, wherein the manifold runner inlets are formed in the plenum chamber on the side adjacent the cylinder bank spaced from that served by the runner and the re-entrant delivery portion is connected to the inlet port by a connecting portion that extends transversely across the valley.

10. An internal combustion engine as set forth in claim 2, wherein the atmospheric air supply extends over one of the cylinder banks.

11. An internal combustion engine as set forth in claim 10, further including a flow controlling throttle valve in the air inlet device.

12. An internal combustion engine as set forth in claim 11, further including an idle bypass passageway extending across the throttle valve for providing idle air flow to the engine.

13. An internal combustion engine as set forth in claim 11, further including means providing an exhaust gas recirculation inlet to the air inlet device.

14. An internal combustion engine as set forth in claim 2, wherein there are a pair of atmospheric air supplies each extending over a respective one of the cylinder banks.

15. An internal combustion engine as set forth in claim 14, further including a manually operated throttle valve in each of the air inlets device for controlling the flow therethrough.

* * * * *